Nov. 30, 1965 M. FILL 3,220,051
SHOULDER AREA HIDE PULLER
Filed May 11, 1964 3 Sheets-Sheet 1

INVENTOR:
METRO FILL.
BY
HIS ATTYS

Nov. 30, 1965 M. FILL 3,220,051
SHOULDER AREA HIDE PULLER
Filed May 11, 1964 3 Sheets-Sheet 2

INVENTOR.
METRO FILL
BY
HIS ATTY'S

Nov. 30, 1965  M. FILL  3,220,051
SHOULDER AREA HIDE PULLER
Filed May 11, 1964  3 Sheets-Sheet 3

PNEUMATIC LINE —·—·—
HYDRAULIC LINE — — —
ELECTRICAL LINE - - - - -

INVENTOR
METRO FILL
BY
HIS ATTY'S

United States Patent Office 3,220,051
Patented Nov. 30, 1965

3,220,051
SHOULDER AREA HIDE PULLER
Metro Fill, Winnipeg, Manitoba, Canada, assignor to Canada Packers Limited, St. Boniface, Manitoba, Canada
Filed May 11, 1964, Ser. No. 366,395
13 Claims. (Cl. 17—21)

My invention relates to new and useful improvements in hide pullers for carcasses, particularly for hide pullers adapted to strip the hide from the shoulder and neck area of said carcass.

Conventional hide pullers for stripping a portion of the hide from the carcass are well known and are exemplified by W. J. Hincks 2,696,633.

However, such pullers do not strip the hide from over the shoulder and neck areas of the carcass, such stripping normally being done manually.

Attempts have been made to strip the hide completely from the animal but due to the configuration of the shoulder and neck areas, considerable damage occurs to the hide at this region thus lowering the value thereof.

Furthermore it is desirable to have more than one hide puller processing carcasses on a moving rail as this facilitates the flow of cattle or the like and enables a greater number to be processed on a single conveyor line.

The hide puller hereinafter to be described, is adapted specifically to pull the hide over the shoulder and neck areas, it being understood that the head of the carcass has been removed, the front feet have been skinned out, and the carcass has been opened up from the brisket to the flank in the usual manner and the hide rimmed back along each side of the cut as is conventional. These various processes can either be completed prior to arrival at the hide pulling station or at the station. In some instances the head and feet may remain on the carcass until a later point in the processing upon the rail.

In order to provide a hide puller having the above characteristics it is necessary first to clamp the animal in a substantially vertical position by the front feet thereof so that it is held between the overhead rail and the clamping means, and then grip the hide portions of the skinned out feet one upon each side of the carcass and exert a pull at an upwardly inclined angle from the horizontal which strips the hide over the relatively enlarged shoulder and neck areas without damage occurring to the hide.

The principal object and essence of the invention is therefore to provide a shoulder area hide puller which enables the hide to be stripped from this area rapidly and efficiently.

Another object of the invention is to provide a device of the character herewithin described which is easily adjustable for use with a variety of sizes of carcasses.

Another object of the invention is to provide a device of the character herewithin described which is particularly well suited for inclusion in a continuous overhead rail processing system of cattle carcass processing.

A still further object of the invention is to provide a device of the character herewithin described which is easily operable by one or two men as desired, depending upon the number of cattle being processed.

Still another object of the invention is to provide a device of the character herewithin described which includes normal means for clamping the front feet of the carcass and furthermore, for applying tension between the upper rail support means so that the carcass is held relatively rigid during the hide stripping operation.

Another object of the invention is to provide a device of the character herewithin described which is simple in construction, economical in manufacture, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

Figure 1:
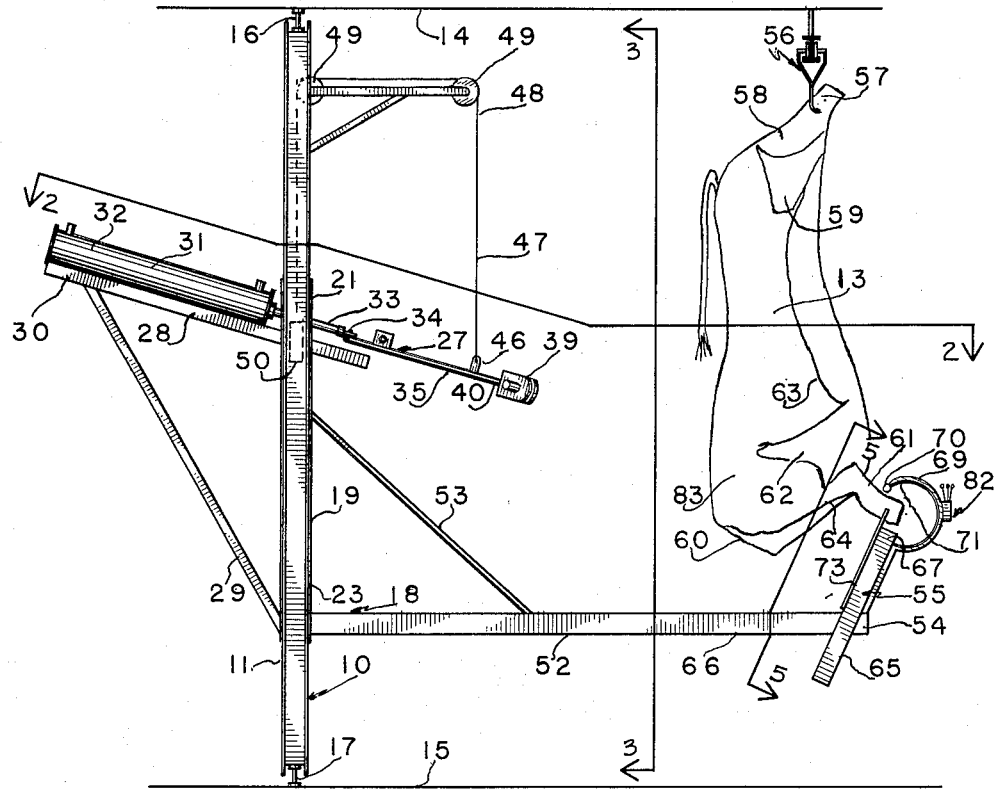
FIGURE 1 is a side elevation of my device showing a schematic view of a cattle carcass in position.

Proceeding therefore to describe my invention in detail, reference should first be made to FIGURE 1 in which reference character 10 illustrates generally the supporting structure, said structure comprising a pair of spaced and parallel vertically situated girders 11 maintained in the said spaced and parallel relationship by means of upper and lower cross members 12.

In order to provide horizontal adjustment of the device to receive the carcass 13, I have pivotally secured the supporting structure 10 between the upper support surface 14 and the lower support surface 15 by means of pivots 16 and 17 respectively, extending from the centers of the aforementioned cross members 12.

The aforementioned vertical members 11 are preferably H-beams and are adapted to support, for vertical reciprocation, a sub-assembly collectively designated 18. This sub-assembly comprises a pair of spaced and parallel outwardly facing channel members 19, maintained in the spaced and parallel relationship by means of cross members 20 at the upper and lower ends 21 and 22 respectively.

Figure 2:
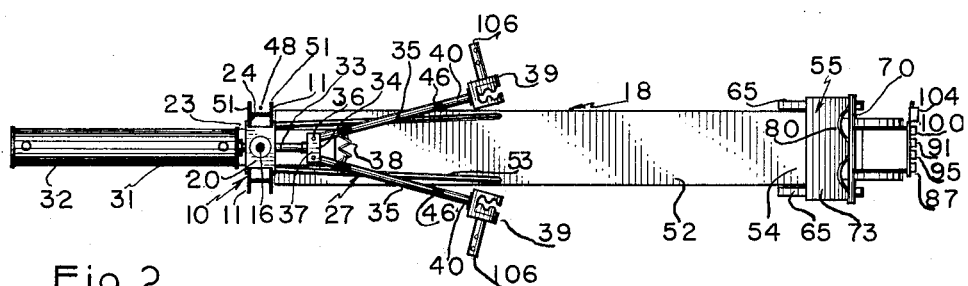
FIGURE 2 is a top plan view substantially along the line 2—2 of FIGURE 1.
Figure 3:
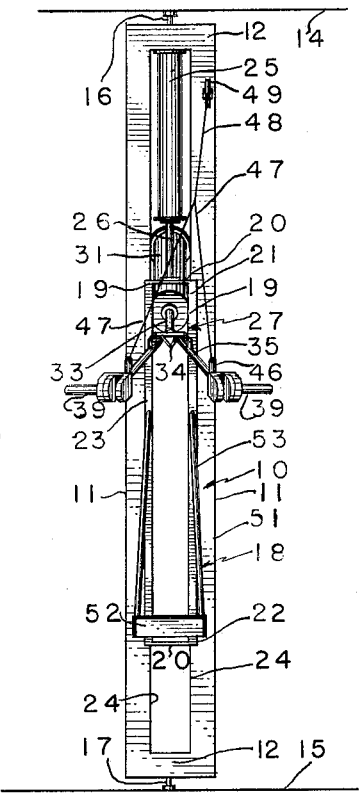
FIGURE 3 is a front elevation substantially along the line 3—3 of FIGURE 1.

The flanges 23 of the channel members 19 engage around the inner flanges 24 of the H-beams and mount the sub-assembly for bearing support within the main supporting structure 10 as clearly shown in FIGURES 1, 2 and 3.

Means are provided to control the vertical reciprocation of the sub-assembly 18, said means taking the form of a fluid operated piston and cylinder assembly 25 reacting between the uppermost cross member 12 of the main frame and the uppermost cross member 20 of the sub-assembly, the piston rod 26 being secured to the sub-assembly as shown in FIGURE 3.

The details of operation of this piston and cylinder assembly will be described later in conjunction with the remainder of the operating portions of the device.

A hide gripping assembly collectively designated 27 is secured and supported adjacent the upper end 19 of the sub-assembly by means of an inclined member 28 secured to the sub-assembly with the major portion thereof extending rearwardly of the device as shown in FIGURE 1 and being supported in the inclined position by means of diagonal brace 29 extending between adjacent the rear end 30 of the member 28 and the lower end 22 of the sub-assembly.

Upon this support 28 is provided a fluid operated piston and cylinder assembly 31 comprising a cylinder 32 and an extending and retracting piston rod 33, it being understood that the piston rod extends and retracts between the two spaced and parallel members 19 of the sub-assembly 18.

Pivotally secured to the outer end 34 of the piston rod 33 is a pair of outwardly diverging arms 35 mounted by pivots 36 to a cross head 37 secured to the piston rod 33 and a spring 38 is secured between these two arms adjacent the pivot point 36 normally maintained in the arms in the outer position as illustrated in FIGURE 2.

A hide gripping assembly 39 is secured upon the other ends 40 of the arms 35 and each hide gripping assembly comprises a stationary serrated plate 41 extending at right angles to a base plate 42. A bearing plate 43 also extends at right angles from the base plate 42 in spaced and parallel relationship with the stationary plate 41 and this bearing plate supports a movable serrated plate or jaw 44 and is operated by a fluid controlled piston and cylinder assembly contained within the cylinder 45 extending outwardly from the bearing plate 43.

The operation of this fluid operated device will be explained later together with the other sources of power but it should be observed that the serrations of the fixed or stationary plate or jaw 41 are opposite to the serrations in the movable jaw 44 so that they mesh together when the movable jaw engages the fixed jaw thus providing a firm clamp for the hide as will hereinafter be described.

Due to the weight of the arms 35 and the hide gripping assemblies 39, it is necessary to support same when the piston rod 33 is extended and in this connection I have provided a bracket 46 upon each arm adjacent the ends 40 thereof to which cables 47' are secured, said cables converging to a common cable 48, as shown in FIGURE 3.

This common or single cable 48 passes over a sheave 49 secured to one member (11) of the main supporting structure and passes through an aperture (not illustrated) in the flange of this member to be secured to a counterweight 50 which is adapted to run vertically between the outer flanges 51 of this support member. This counterweight takes the weight of the extending arm assembly 27 and prevents strain occurring upon the piston and cylinder assembly 31.

A front leg anchor means support platform 52 is secured to and extends outwardly from the lower ends 22 of the sub-frame members 19, said platform being of channel cross section preferably and being situated substantially horizontally to the lower support surface 15. In this connection diagonal braces 53 extend from the platform 52 upwardly and rearwardly to be secured to the member 19 of the sub-frame as clearly shown in FIGURES 1 and 2.

Situated upon the outer or distal end 54 of the platform 52 is an assembly collectively designated 55 adapted to detachably anchor the front legs of the carcass as will hereinafter be described.

However, prior to a description of this assembly, reference should be made to FIGURE 1 in which 13 illustrates a carcass suspended from an overhead conveyor rail assembly 56 by the rear legs 57.

This carcass, prior to reaching the hide puller, is prepared by skinning out the hind feet 57 and the butts 58, the hide portion at this area being illustrated by the reference character 59.

The head is removed leaving the neck 60 and the front feet 61 are skinned out with the hide flaps 62 lying upon each side of the carcass as shown in FIGURE 1 (one side only being illustrated in this view).

The carcass is opened up along the middle of the belly from the brisket to the flank in the conventional way and rimmed over approximately 6 to 8 inches along each side of the cut, said rimmed hide being illustrated by reference character 63.

In addition to skinning out the front feet 61, it is preferable to clear the front shoulders 64 to about 1 inch beyond the red tissue line. The foregoing is conventional packing house practice for the treatment of carcasses upon a rail and further details are therefore deemed unnecessary.

Reverting back to the front leg anchoring assembly 55, this consists of a pair of spaced and parallel beams 65 secured as by welding to each side flange 66 of the platform 52 and extending above and below the platform 52 as shown in FIGURE 1. These beams lie at an angle inclined from the vertical with the upper ends 67 thereof inclining forwardly of the main supporting structure 10.

Secured to these beams as by welding is a pair of spaced and parallel support members 68 which are semi-circularly curved on the upper portions 69 in order to carry a horizontally situated upper anchor bar 70 upon the upper ends 71 thereof and it is desirable that side supporting flanges 72 to be provided adjacent the junction of the members to the bar 70 in order to strengthen same and make the support bar relatively rigid.

Figure 8:
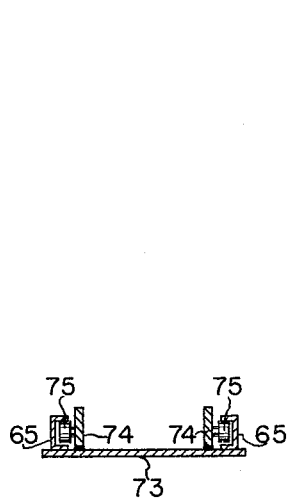
FIGURE 8 is a horizontal section through FIGURE 5 showing the method of mounting the clamping plate.

A lower clamping plate 73 is mounted for receiprocation upon the beams 65, which are preferably channel members as shown in FIGURE 8. Lugs 74 extend from the underside of the plates 73 and carry rollers 75 engageable between the flanges of the channel members 65 and a fluid operated piston and cylinder assembly 76 (shown in FIGURE 5) reacts between a support 77 secured to the platform 52 and lugs 78 secured to the plate 73 so that the plate can be reciprocated up and down the channel supports 65.

Figures 5, 6:
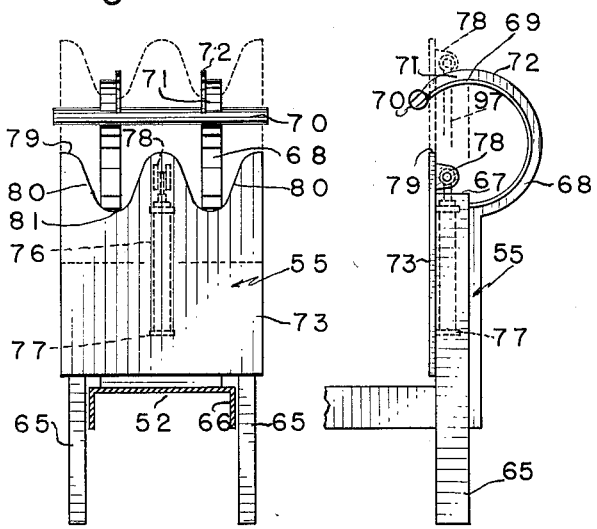
FIGURE 5 is an enlarged front view of the front leg anchoring portions substantially along the line 5—5 of FIGURE 1.
FIGURE 6 is a side elevation of FIGURE 5.

The upper side 79 of the plate is provided with a pair of recessed portions 80 as shown in FIGURE 5 and this part of the plate is adapted to slide by the bar 70 just clearing same.

From the foregoing it will be appreciated that the front legs 61 of the carcass 13 can be nested within the recessed portions 80 of the plate whereupon upward reciprocation of the plate will clamp the legs firmly and rigidly between the bases 81 of the recesses 80 and the bar 70.

Figure 9:
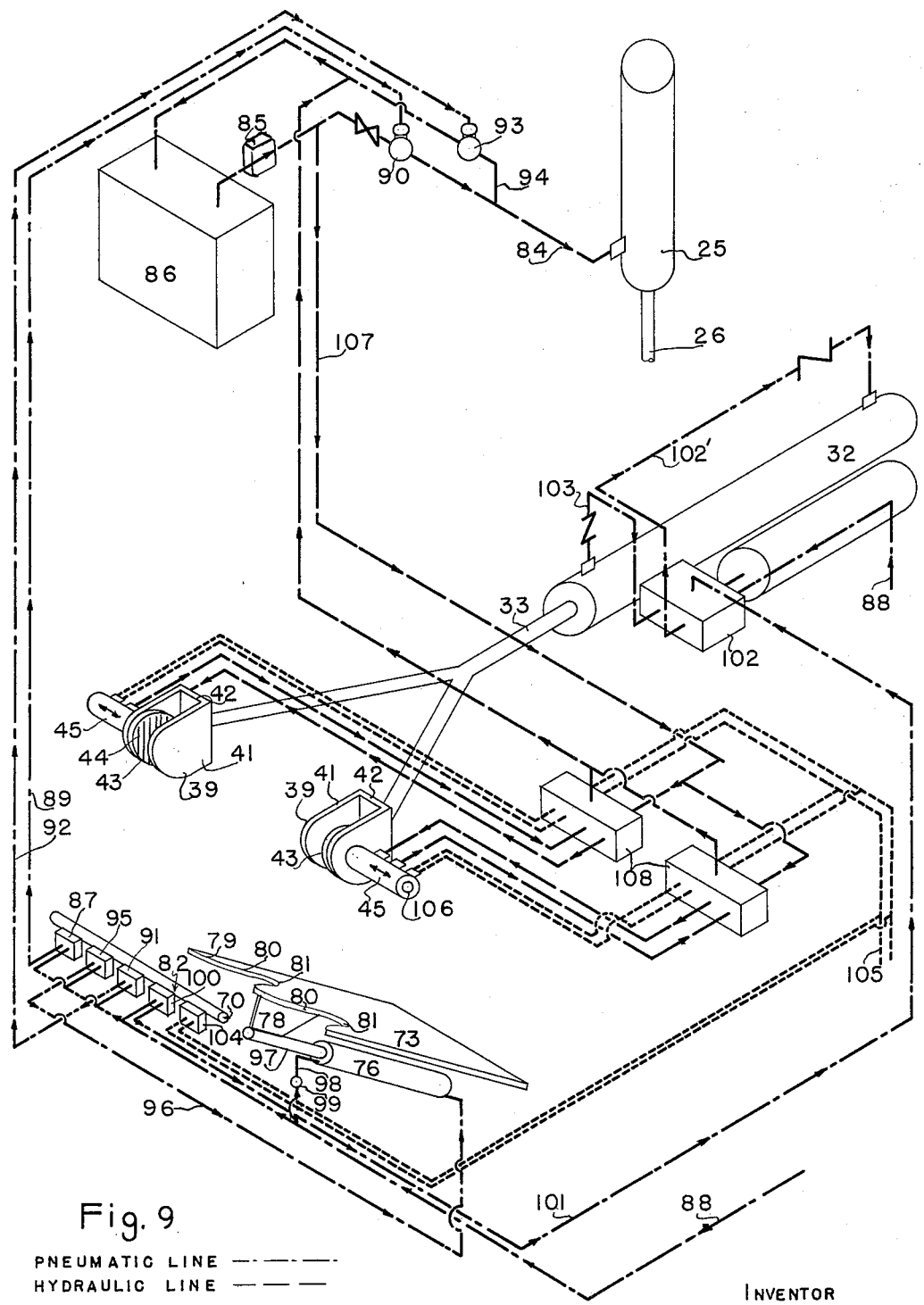
FIGURE 9 is a schematic view of the operating components of the device together with the various sources of power and operating valve structure associated therewith.

For convenience, the various operating controls collectively designated 82 are mounted upon the semi-circular supports 69 and reference should now be made to FIGURE 9 which shows a schematic view of the various components of the assembly together with the sources of power therefor.

In this particular embodiment, a combination of pneumatic and hydraulic power is used, and the hide gripping jaw assembly 39 are controlled by electric solenoids in combination with hydraulic fluid pressure. However, it should be appreciated that the particular fluid used is a matter of choice.

Before describing the various sources of power for the operation of the components, a brief description of the operation is given.

The entire device is positioned horizontally around the pivots 16 and 17 so that the leg anchoring means 55 are adjacent the front legs 61 of the carcass to be skinned.

The vertical piston and cylinder assembly 25 is actuated to adjust the position of the sub-frame 18 so that the front legs will enter the leg anchoring assembly.

The legs are engaged within the recesses 80 of the movable plate 73 whereupon the plate is activated to move upwardly thus clamping the legs firmly in position against the upper bar 70.

The entire sub-frame is now lowered slightly by means of the vertically situated piston and cylinder assembly 25, to apply tension to the carcass 13 between the overhead rail 56 and the anchoring assembly 55.

The hide gripping assembly 27 is extended by operation of the piston and cylinder assembly 31 so that the gripping jaws 39 are adjacent the front leg hide flaps 62.

These flaps are engaged between the jaws 41 and 44 and the jaws are closed thus clamping the hide flaps 62 firmly therebetween.

The assembly 27 is then retracted by means of piston and cylinder assembly 31 thus stripping the hide rearwardly and upwardly over the neck and shoulder areas 64 and 83. In this connection, the rearward pull on the arms 35 will cause them to move inwardly towards one another thus keeping the jaw assembly 39 in close contact with the configuration of the carcrass against pressure of spring 38.

When the hide has been stripped from the neck and shoulder areas, the gripping jaws are released, the front feet 61 are released and the carcass proceeds upon the rail to the next station.

Dealing first with the vertically situated piston and cylinder assembly 25 and 26, this is hydraulically operated through hydraulic line 84 entering the cylinder below the piston (not illustrated). This line extends from pump 85 driven by a source of power (not illustrated), inserted with a hydraulic fluid reservoir 86.

A two-way valve 87 situated upon the control panel 82 is connected upon one side, to a source of pneumatic air pressure through conduit 88 and upon the other side, through conduit 89, to a pneumatically operated hydraulic valve 90 situated within line 84.

The valve 87 is normally closed but when the control is moved, a shot of compressed air actuates the hydraulic valve 90 thus routing hydraulic fluid from the pump 85, through line 84 to below the piston within cylinder 25 thus raising piston rod 26 together with the sub assembly 18. When sufficient height is obtained, the valve 87 is closed thus automatically closing valve 90 and locking the piston and cylinder 25 and 26 in position.

If it is desired to lower the piston connected to rod 26, then valve 91 is operated thus giving a shot of compressed air from the pneumatic source, through line 92 to a further pneumatically operated hydraulic valve 93 situated in a return line 94 extending between line 84 and the hydraulic reservoir. This permits the weight of the sub assembly to lower the piston forcing hydraulic fluid back through the line 84 to the reservoir until control 91 is closed thus closing valve 93 and locking the piston and cylinder assembly 25 and 26 in this position.

Valve 95 on the control panel 82 is connected to the source of pneumatic air through line 88 and is also normally closed. However, when it is open, it routes this compressed air through conduit 96 to the underside of the piston and cylinder assembly 76 thus extending the piston rod 97 and raising the plate 73 to lock the legs of animal between the plate and the bar 70 as hereinabove described.

A further line or conduit 98 extends from the upper end of cylinder 76 to the main pneumatic line 88 through a reducing valve 99 so that when the piston rod 97 is extended, it is against a reduced air pressure which is present above the piston at all times. This means that as soon as the valve 95 is closed, this reduced air pressure drives the piston and rod 97 downwardly, the pneumatic air exhausting in the normal manner, so that the plate is normally in its lowermost position and ready to receive the front legs of the next succeeding carcass to be stripped.

Valve 100 on the control panel 82, is also connected to the main pneumatic line 88 and is normally closed. However, when it is opened, a shot of compressed air passes through line 101 to a conventional four-way valve 102 and operates a shuttle within this valve which connects the source of pneumatic air to the rear side of the piston within cylinder 32 thus extending the piston rod 33 together with the hide gripping assemblies 39.

Conversely, when valve 100 is closed, the shuttle within the four-way valve 102, is reversed thus routing compressed air to the front end of the cylinder 32 via conduit 103 thus retracting the piston rod 33 together with the hide gripping assemblies 39.

Also situated on the main control panel 82 is an electric switch 104 connected to a conventional source of electrical energy through conduit 105. This acts as a main switch for the operation of the hide gripping assemblies which are individually controlled by means of electrical switches 106 situated upon the end of each of them.

These electrical switches control a solenoid operated valve within the assembly which routes hydraulic fluid passing through conduit 107 to the solenoid operated valves 108.

The solenoid operated valves route this hydraulic fluid to either side of the piston and cylinder assemblies controlling the movable jaws 44 of the hide gripping assemblies 39.

Figure 7:
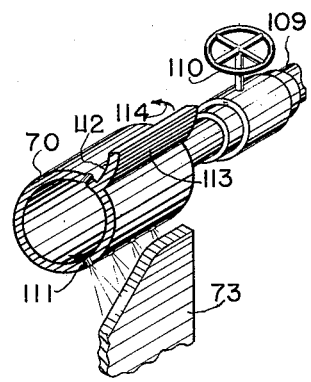
FIGURE 7 is an enlarged fragmentary isometric view of a portion of the upper clamping bar showing the sterilizing means associated therewith.
Figure 4:
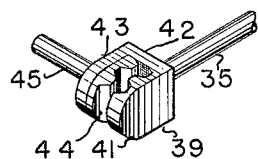
FIGURE 4 is an enlarged fragmentary perspective view of the one of the hide gripping jaw assemblies.

Finally reference should be made to FIGURE 7 which shows a method of sterilizing the front feet anchoring assembly.

The bar 70 is formed as a closed ended tube having a steam and water line 109 secured to one end thereof controlled by valve 110.

A plurality of apertures 111 are drilled through the base of the bar to direct steam and hot water upon the plate 73 prior to each carcass being anchored thereby.

A plurality of smaller apertures 112 are situated upon the upper side of the device permitting a relatively small quantity of steam and hot water to be directed into a trough 113 secured to the bar along the upper side thereof. As this trough fills with water, it spills over the bar in the direction of arrows 114 and maintains the bar in a sterile condition.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A shoulder area hide puller for carcasses suspended by the rear legs thereof from an overhead rail with the back of the animal facing said hide puller, and having the head removed, the front feet skinned out, being opened up along the middle of the belly from substantially the brisket to the flank, and having the hide rimmed back manually along the cut edges of the hide; comprising in combination a substantially vertical supporting structure, means supported by said supporting structure to detachably anchor the front legs of said carcass so that said carcass is held in a substantially vertical position, means supported by said supporting structure detachably securable to the hide portions skinned out from the front feet of said carcass and means on said supporting structure operatively connected to said last mentioned means to move said last mentioned means away from said carcass, thereby stripping the hide from the shoulder and neck areas of said carcass, and a source of power for said means to detachably anchor the front legs of said carcass, said means detachably securable to the hide portion skinned out from the front feet, and said means for moving said last mentioned means away from said carcass.

2. The device according to claim 1 which includes a sub assembly mounted for vertical reciprocation within limits on said supporting structure, all of said means being mounted on said sub assembly, and a source of power to move said sub assembly in said supporting structure.

3. The device according to claim 2 in which said means detachably securable to the hide portions skinned out from the front feet of said carcass includes a fluid operated piston and cylinder assembly, a pair of outwardly diverging arms pivotally connected by one end thereof to the outer end of the piston rod of said piston and cylinder assembly, fluid operated hide gripping jaws secured to the other ends of said diverging arms, and spring means reacting between said arms normally maintaining said arms in the outermost divergent position.

4. The device according to claim 3 in which said means to detachably anchor the front legs of said carcass includes a pair of spaced and parallel support members, an upper clamping bar secured to said support members at right angles thereto and spaced above the upper ends of said support members, a lower clamping plate mounted for reciprocation on said support members, the upper end of said plate adapted to slide past said bar, a source of power for reciprocating said plate, the upper side of said plate having a pair of recessed portions to receive the front legs of said carcass, said bar cooperating to clamp said legs therebetween.

5. The device according to claim 4 in which said supporting structure includes a pair of vertically situated spaced and parallel members, said sub assembly including a support frame journalled for vertical reciprocation within said spaced and parallel members, said means detachably securable to the hide portions skinned out from the front feet of said carcass, being mounted upon said support frame, adjacent the upper end of said support frame, a front leg anchor means support platform secured adjacent the lower end of said support frame and extending outwardly at right angles therefrom, said means to detachably anchor the front legs of said carcass being secured to the outer end of said support platform.

6. The device according to claim 3 in which said supporting structure includes a pair of vertically situated spaced and parallel members, said sub assembly including a support frame journalled for vertical reciprocation within said spaced and parallel members, said means detachably securable to the hide portions skinned out from the front feet of said carcass, being mounted upon said support frame, adjacent the upper end of said support frame, a front leg anchor means support platform secured adjacent the lower end of said support frame and extending outwardly at right angles therefrom, said means to detachably anchor the front legs of said carcass being secured to the outer end of said support platform.

7. The device according to claim 2 in which said means to detachably anchor the front legs of said carcass includes a pair of spaced and parallel support members, an upper clamping bar secured to said support members at right angles thereto and spaced above the upper ends of said support members, a lower clamping plate mounted for reciprocation on said support members, the upper end of said plate adapted to slide past said bar, a source of power for reciprocating said plate, the upper side of said plate having a pair of recessed portions to receive the front legs of said carcass, said bar cooperating to clamp said legs therebetween.

8. The device according to claim 7 in which said supporting structure includes a pair of vertically situated spaced and parallel members, said sub assembly including a support frame journalled for vertical reciprocation within said spaced and parallel members, said means detachably securable to the hide portions skinned out from the front feet of said carcass, being mounted upon said support frame, adjacent the upper end of said support frame, a front leg anchor means support platform secured adjacent the lower end of said support frame and extending outwardly at right angles therefrom, said means to detachably anchor the front legs of said carcass being secured to the outer end of said support platform.

9. The device according to claim 2 in which said supporting structure includes a pair of vertically situated spaced and parallel members, said sub assembly including a support frame journalled for vertical reciprocation within said spaced and parallel members, said means detachably securable to the hide portions skinned out from the front feet of said carcass, being mounted upon said support frame, adjacent the upper end of said support frame, a front leg anchor means support platform secured adjacent the lower end of said support frame and extending outwardly at right angles therefrom, said means to detachably anchor the front legs of said carcass being secured to the outer end of said support platform.

10. The device according to claim 1 in which said means detachably securable to the hide portions skinned out from the front feet of said carcass includes a fluid operated piston and cylinder assembly, a pair of outwardly diverging arms pivotally connected by one end thereof to the outer end of the piston rod of said piston and cylinder assembly, fluid operated hide gripping jaws secured to the other ends of said diverging arms, and spring means reacting between said arms normally maintaining said arms in the outermost divergent position.

11. The device according to claim 10 in which said means to detachably anchor the front legs of said carcass includes a pair of spaced and parallel support members, an upper clamping bar secured to said support members at right angles thereto and spaced above the upper ends of said support members, a lower clamping plate mounted for reciprocation on said support members, the upper end of said plate adapted to slide past said bar, a source of power for reciprocating said plate, the upper side of said plate having a pair of recessed portions to receive the front legs of said carcass, said bar cooperating to clamp said legs therebetween.

12. The device according to claim 1 in which said means to detachably anchor the front legs of said carcass includes a pair of spaced and parallel support members, an upper clamping bar secured to said support members at right angles thereto and spaced above the upper ends of said support members, a lower clamping plate mounted for reciprocation on said support members, the upper end of said plate adapted to slide past said bar, a source of power for reciprocating said plate, the upper side of said plate having a pair of recessed portions to receive the front legs of said carcass, said bar cooperating to clamp said legs therebetween.

13. Means to detachably anchor the front legs of a carcass suspended by the hind legs thereof from an overhead rail, comprising in combination a pair of spaced and parallel support members, an upper clamping bar secured to said support members at right angles thereto and spaced above the upper ends of said support members, a lower clamping plate mounted for reciprocation on said support members, the upper side of said plate adapted to slide past said bar, a source of power for reciprocating said plate, the upper side of said plate having a pair of recessed portions adapted to receive the front legs of said carcass, said plate and said bar cooperating to clamp said legs therebetween.

References Cited by the Examiner

UNITED STATES PATENTS

| 2,494,138 | 1/1950 | De Moss | 17—45 |
| 3,046,597 | 7/1962 | Macy et al. | 17—21 |
| 3,129,454 | 4/1964 | Johnson | 17—21 |

FOREIGN PATENTS

| 153,184 | 2/1963 | U.S.S.R. |

SAMUEL KOREN, *Primary Examiner.*

LUCIE H. LAUDENSLAGER, *Examiner.*